United States Patent [19]

Parker

[11] Patent Number: 4,958,368
[45] Date of Patent: Sep. 18, 1990

[54] CUSTOMER ACTIVATION SYSTEM
[75] Inventor: Terry S. Parker, Spring, Tex.
[73] Assignee: GTE Mobilnet Incorporated, Houston, Tex.
[21] Appl. No.: 265,183
[22] Filed: Oct. 31, 1988
[51] Int. Cl.⁵ .............................................. H04M 1/57
[52] U.S. Cl. ...................................... 379/91; 379/58; 379/59
[58] Field of Search ................... 379/59, 60, 58, 63, 379/91; 455/33, 34

[56] References Cited
U.S. PATENT DOCUMENTS 4,616,108 10/1986 Yamaguchi et al. .................. 379/63
4,640,986 2/1987 Yotsutani et al. ..................... 379/60
4,672,377 6/1987 Murphy et al. ................. 340/825.34
4,748,655 5/1988 Thrower et al. ...................... 379/60

Primary Examiner—Robert Lev
Attorney, Agent, or Firm—John A. Odozynski

[57] ABSTRACT

A Customer Activation System, including a method and apparatus, for expeditiously providing a cellular mobile radiotelephone (CMR) customer access to CMR service. The system includes a regional processor programmed to:
accept information identifying the CMR customer;
obtain a credit check of the CMR customer;
assign a telephone number to the CMR customer; and
insert and activate the telephone number in a cellular switch.

42 Claims, 1 Drawing Sheet

CUSTOMER ACTIVATION SYSTEM

FIELD OF THE INVENTION

This invention relates to the provision of cellular mobile radiotelephone (CMR) service and, more particularly, to a system, encompassing both a method and apparatus, that in a preferred embodiment includes a regional processor for expeditiously providing a CMR customer access to CMR service.

BACKGROUND OF THE INVENTION

CMR service is one of the most rapidly growing telecommunication services currently offered. (See, for example, "Surging, Price-Insensitive Demand Over Next Two Years and Strong Five-Year Picture Forecast for Cellular Industry Association, Which Sees Capacity Concerns Validated," TELECOMMUNICATIONS REPORTS, Aug. 15, 1988 (pp. 22, 23).) The technology underlying CMR service is exhaustively documented and well within the understanding of those possessed of ordinary skill in the art of CMR communications. Accordingly, a rigorous description of CMR technology will not be undertaken here, and the reader will be referred to the following representative publications, the contents of which are hereby incorporated by reference:

Bernard, Joseph. 1987. *The Cellular Connection*. Mendocino, Calif.: Quantum Publishing.

Gibson, Stephen W. 1987. *Cellular Mobile Radiotelephones*. Edgelwood Cliffs: Prentice-Hall.

The projected growth of the CMR industry is rivaled only by the degree of competition engendered among those who provide CMR equipment or CMR service to the burgeoning customer population. As a result, the prudent provider of CMR equipment or service continually searches for ways to achieve a competitive advantage in the market place by identifying approaches that will allow him to enhance the quality of equipment or service he might make available to prospective customers. This invention is directed to a specific aspect of the provision of CMR service that has heretofore represented something of an obstacle rather than an attraction in the marketing of CMR service: the cumbersome and time-consuming process that must be endured in order for a CMR customer, who has decided to subscribe to CMR service, to be provided with that service.

Conventionally, once a CMR customer has purchased his equipment and desires to be activated on the cellular system of his choice, the following procedure is encountered. The customer is initially required to complete a paper form with information that includes his name, address, nearest relative, and so forth. The selling agent might then transmit this information, via, for example, facsimile, to a customer service representative ("CSR"). The CSR then attempts to obtain a credit report relating to the customer. Here a significant delay may be encountered because of the CSR's backlog of active credit-report requests or because of the backlog that may exist at the credit reporting service It is not uncommon for the delay at this juncture to approach one to two hours.

After the credit report has been received, the CSR then conveys to the agent, via telephone or facsimile, the results of the credit report and, based on the credit report, the amount of the deposit required from that customer. (Different deposit requirements will be exacted on different customers, depending largely on the customers' credit ratings.) The agent must then convey to the CSR the customer's agreement to pay the required deposit amount.

At this point, the CSR would access a centralized processor in order to "activate" the customer in a cellular switch and to generate a billing record. The centralized processor would need be connected to all relevant cellular switches and to a billing processor. As it may well be apprehended, the accumulated time required to achieve customer activation can approach, if not exceed, three hours.

The subject invention, however, is directed to a system for performing the same, and additional, functions in approximately 15 minutes—and does so with significant conservation of both the agents' and the CSRs' labor. As a matter of fact, the involvement of the CSR can be nearly eliminated, and the CSR would be called on to intervene in only the unusual, rather than the routine, customer activation.

SUMMARY OF THE INVENTION

The above and other objects, advantages, and capabilities are achieved by a Customer Activation System ("CAS"), including a method and apparatus, for expeditiously providing a cellular mobile radiotelephone (CMR) customer access to CMR service. The system includes a regional processor programmed to:

(a) accept information identifying the CMR customer;

(b) obtain a credit check of the CMR customer;

(c) assign a telephone number to the CMR customer; and (d) insert and activate the telephone number in a cellular switch.

Specifically, once a selling agent has been permitted to log on to the System, the agent enters, through a data entry device coupled to the regional processor, the customer's social security number. The regional processor responds with a voice prompt that provides expanded information derived from the social security number. If the expanded information is accurate, the processor then obtains a credit report relating to the customer. In a preferred embodiment, the processor commissions a credit report from a credit service bureau. If the credit report results in approval, the agent then enters, via the data entry device, number data corresponding to the NPA/NXX of the CMR system to which the customer desires to subscribe. The regional processor then appends a 4-digit suffix to the NPA/NXX so as to formulate the customer's CMR telephone number, or MID. The regional processor then inserts and activates the MID in an associated cellular switch. In addition, CAS then formats a billing record related to the newly activated customer and enters the billing record on a billing processor.

BRIEF DESCRIPTION OF THE DRAWINGS

FIG. 2 conveys conceptually the manner in which data may be entered on the regional processor via a VoiceNet Requestor. The VoiceNet Requestor, through numerous software Servers, then interacts with various internally maintained and external databases, as well as a local cellular switch.

DESCRIPTION OF A PREFERRED EMBODIMENT

For a better understanding of the subject invention, reference is made to the following Description and appended Claims in conjunction with the above-described Drawings.

Figure 1:
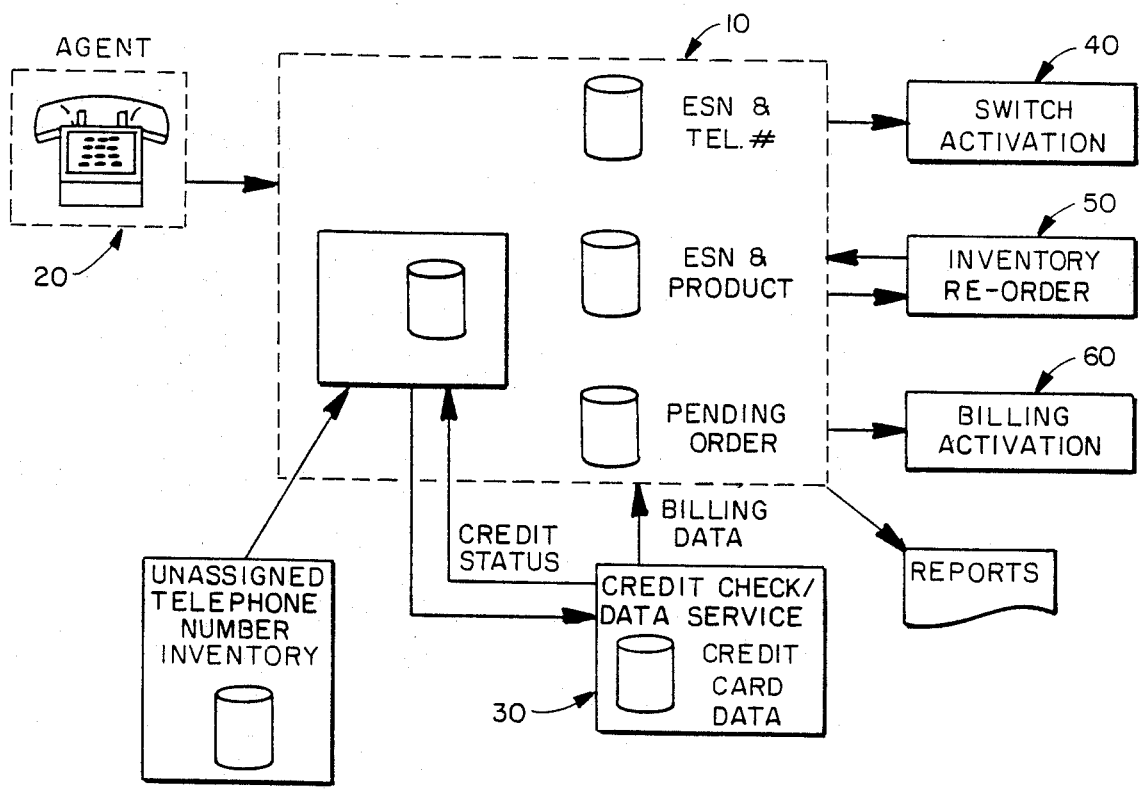
FIG. 1 is a block diagram of the subject Customer Activation System, depicting the CAS regional processor as well as (i) the mechanism by which data may be entered on the regional processor and (ii) the various databases and other processors with which the regional processor interacts in order to achieve customer activation.

Referring now to the FIG. 1, depicted therein is the keystone of the subject Customer Activation System: the CAS regional processor 10. In a preferred embodiment processor 10 may be realized by a Tandem model CLX computer available from Tandem Computers, 19191 Vallco Parkway, Cupertino, Calif. 95014. In this form, the regional processor is equipped with dual processors, dual 8-Mbyte RAMs, and two mirrored 400-Mbyte disc drives. (The processor and memory redundancy provides the regional processor substantial fault tolerance and, therefore, markedly enhances not only its reliability but the reliability of the entire CAS as well.) In addition, the regional processor offers four synchronous communications ports and four multifunction ports.

The processor is "regional" in the sense that it is a dedicated component of a CAS associated more or less exclusively with a particular cellular system. The regional processor can be expected to be physically located within the geographical area covered by that system. That is, each CAS will comprise its own, dedicated, regional processor. Accordingly, selling agents of a local cellular system are able to access that system's processor 10 via data entry devices 20 coupled to the local telephone exchange. In a preferred embodiment, devices 20 represent standard telephone sets capable of transmitting information not only in voice form but also in the form of DTMF signals that originate from the telephone keypad. Because the processor is regional, access by telephones 20 will not, in general, involve interexchange carriage, and telecommunications charges associated with the use of CAS will be minimized.

Figure 2:
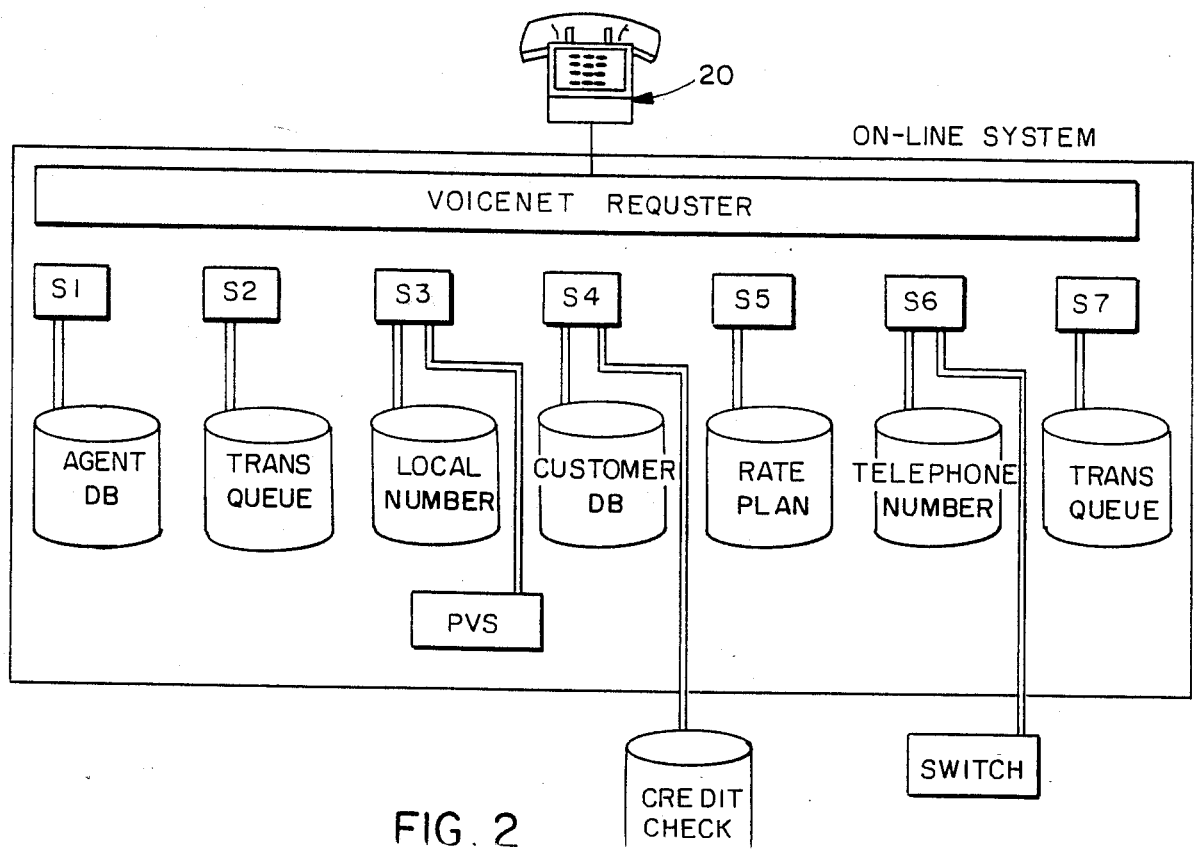
FIG. 2 is a diagram of the CAS software architecture.

In addition to the hardware described above, processor 10 incorporates several software components, described in detail below, that permit the processor to be programmably coupled to, and exchange information with, a remote credit reporting service bureau 30, a local cellular switch 40, an inventory maintenance system 50, and a billing processor 60. In addition, the regional processor may contain internally resident databases necessary or useful in the customer-activation process. FIG. 2 depicts many of the internally resident databases utilized by CAS.

The CAS software includes the following three elemental components:
 (I) The VOICE-NET ® System;
 (II) The CAS Main System; and
 (III) Data Structures.

FIG. 2 generally depicts the software architecture of the CAS.

I. VOICE-NET ® SYSTEM

One of the elemental components of the CAS software is the software product referred to a VOICE-NET ®, available from Input Output Computer Services, Inc. ("IOCS"), 400 Totten Pond Road, Waltham Mass. 02254. In general, permits access to a wide array of databases from DTMF telephones. Once telephone contact is established with the processor in which the database resides, a caller may use the telephone keypad to enter or retrieve data in response to prompts (instructions) that are voiced to the caller through the operation of the VOICE-NET ® software. The precise method by which this functionality is arrived at is described in the document entitled "VOICE-NET ® Operations Manual" (hereby incorporated by reference and available from IOCS at the above address) and will, therefore, not be further discussed in this Description. In addition, the document entitled "VOICE-NET ® Tandem Software Architecture" provides specific information related to the use of VOICE-NET ® products in a Tandem-based environment.

In addition to the kernel software, CAS comprises complementary software designed to perform the functions and provide the software interfaces included in CAS, as described herein. The generation of such application-specific software is easily realized by programmers who are possessed of ordinary skill in the art and who have been equipped with the understanding of the operation of CAS as set forth below in this Description. The document entitled "VOICE-NET ® Applications Generator [VN-2] User's Manual" is calculated to provide whatever assistance may be desired in this regard. (That document is hereby incorporated by reference.) It is useful to note, however, that VOICE-NET ® software incorporates a feature referred to as a VoiceNet Requestor. The VoiceNet Requestor operates as a software gateway between the kernel and the linking software that is written to, inter alia, transfer information between the kernel and databases that may be either external or internal to the CAS regional processor 10. The "linking" software is implemented in the form of a number of "Servers" that are described below.

II. CAS MAIN SYSTEM

The CAS Main System includes a number of software modules, referred to as "Servers," that perform the functions and require the interfaces set forth below.

AGENT VALIDATION SERVER

Functionality

The Agent Validation Server accesses the Agent File (See below in "*III. Data Structures.*") to determine the correctness of the agent logon and password. This server also updates the last logged-on timestamps and the Log File with all pertinent information regarding valid and invalid access attempts. (A logged-on timestamp, indicating date and time, is generated by CAS each time an agent attempts to access CAS.) This server also generates the Transaction Code to be logged, maintained, and used by the remainder of CAS.

Files Accessed

Agent File
Log File

Called By

VoiceNet Requestor

PREVIOUS TRANSACTION SERVER

The Previous Transaction Server responds to the entry of a Transaction Code by first searching the pending transaction queues for any partial or completed transactions and by then responding, either to the VoiceNet Requestor or to a Customer Service Representative, through a customer service information subsystem, with the status of the transaction corresponding to the Transaction Code.

ESN VALIDATION SERVER

The Electronic Serial Number (ESN) Validation Server checks the local database for the status of the input ESN (if active, then invalid) and then accesses the PVS subsystem to determine whether the ESN is located there. (PVS refers to the Positive Validation System available from GTE Data Services Incorporated, Tampa, Fla.) If the answer to both these inquires is "NO", then CAS approves the ESN entered by the agent.

Functionality

The ESN Server first validates the ESN entered by the agent against the local database for active ESNs. It then validates against the PVS database to determine whether the ESN is active or inactive elsewhere on the system. If the ESN proves to be valid on the system, the ESN Validation Server writes the ESN to the Customer Record and to the Valid ESN Database.

Called By

VoiceNet Requestor

CUSTOMER INFORMATION AND CREDIT CHECK ("CICC") SERVER

The CICC Server comprises (a) a Customer Information Function and (b) a Credit Check Function. This server initially determines whether a business or an individual is being activated. If a business is being activated, then the server receives the business name from VOICE-NET®, starts the Customer Identification Record, calls for a credit check rating, fills in the Customer Information Record with the information returned and then replies to the VoiceNet Requestor. If an individual is being activated, then the steps described above similarly occur, except that additional information is received via the VoiceNet Requestor and the credit information history is researched.

(a) Customer Information Function

Functionality

The Customer Information Function creates the Customer Information Record in the Customer Information File by using the initial data elements, for example, the customer's social security number, passed to it from the VoiceNet Requestor. It then initiates a transaction, or a "read," to an outside source (database) based upon the input customer social security number. Upon return from the outside source, the Customer Information Function provides expanded information that may include the complete customer name and address. Once the Customer Information Function has gained the expanded information, it will write the information to the Customer Information Record, and pass the customer name and address back to the VoiceNet Requestor for validation. It will also log all necessary changes in status, along with each access to the outside information source.

The Customer Information Function formats a request to a credit service bureau and, based upon the return answer, returns a validation code to the VoiceNet requestor. It also logs all accesses to the outside credit validation source for billing reconciliation purposes.

Files Accessed

Customer Information File
Log Files

Called By

VoiceNet Requestor

(b) Credit Check Function

The Credit Check Function reads the Customer Information Record and formats a request to a credit service bureau. Based upon the answer returned by the service bureau, a validation code is received by the VoiceNet Requestor. The Credit Check Function also logs all accesses to the credit service bureau for billing reconciliation purposes.

Files Accessed

Customer Information File
Log Files

Called By

VoiceNet Requestor

RATE PLAN SERVER

The Rate Plan Server accepts a Rate Plan that is entered by an agent, validates it against the Rate Plan Database, and writes this information to the Customer Record. Rate Plan Server then returns a confirmation to the VoiceNet Requestor.

TELEPHONE NUMBER ASSIGNMENT ("TNA") AND SWITCH UPDATE SERVER

(a) Telephone Number Assignment Function

Functionality

The Telephone Number Assignment Function determines the cellular telephone number (MID) assigned to the customer. It reads the Available Telephone Number File and, based upon the Agent ID, the area code, and the switch ID, removes the telephone number from the inactive list and assigns it to the customer. It returns the assigned MID to the VoiceNet Requestor and writes the MID to the Customer Information Record. This function also logs all status changes.

Files Accessed

Customer Information File
Unassigned Telephone Number File
Agent File
Switch File
Log File

Called By

VoiceNet Requestor

(b) Switch Update Function

Functionality

The Switch Update Function is responsible for inserting the customer's newly assigned MID into the appropriate switch database. It is activated by the VoiceNet Requestor, which causes the Switch Update Function to read the Customer Information Record for the new MID. The Switch Update Function then accesses the Switch Information File for the proper command structure to complete a switch access. Based on the indicated command structure, it then formats a valid input command stream for inserting the MID into the switch database and awaits a valid reply. Depending upon the reply returned from the switch, this server either returns a completion to the VoiceNet Requestor, or writes to a pending file for later switch update. It also logs all events and status changes. Finally, this server also updates the Customer Information Record with the status changes.

Files Accessed

Customer Information File
Switch Information File
Log Files
Number Activation Pending File

Called By

VoiceNet Requestor

Protocols Used

X.25 for access to the Switch.

CALL-BACK SERVER

Functionality

The Call-Back Server reads a pending file for all outstanding events and returns a call to the agent. Once the call is initiated, the agent will revalidate his Agent ID and password, and he will then be passed the awaited information. The server then logs all events and status changes.

Files Accessed

Customer File
Agent File
Log Files

Called By

VoiceNet Requestor
(Note: A Scheduler Process alerts the VoiceNet Requestor to check for outstanding call-backs. Upon detection of outstanding call-backs, VoiceNet Requestor then calls the server.)

BILLING SYSTEM UPDATE SERVER

This server is activated by either the VoiceNet Requestor, when the telephone number is activated (concurrently and silently), or by a Customer Service Representative, when it is necessary to enter insertions, inquiries, and deletions on the billing system.

Functionality

The Billing System Update Server is called after a valid MID has been assigned to a customer and inserted into the switch database or into a pending file. This server reads the Customer Information Record and formats a new record to be inserted into the main billing system. If the main billing system is unavailable, it places the record in a pending file for insertion at the next available time. It logs all events and status changes and then returns a confirmation to the VoiceNet Requestor.

Files Accessed

Customer Information File
Log File
Billing Pending File

Protocols Used

The Billing System Update Server emulates an IBM 3270 terminal for interface into the main billing computer.

WELCOME LETTER SERVER

Functionality

The Welcome Letter Server generates a "Welcome" letter addressed to the customer. The letter outlines the services purchased, the available features of the system, and suggested new features for customer purchase, as well as restates all pertinent customer information for validation. This letter can be generated both from an on-line request at service initiation or in batch-mode environment.

Files Accessed

Customer Information File
Log Files
Agent File
Switch File
Product Files

TELEPHONE NUMBER COMPARISON SERVER

The Telephone Number Comparison Server performs a daily check of selected telephone numbers active on CAS against the respective cellular switch's database for validation and comparison.

III. DATA STRUCTURES

The Files utilized by the CAS Main System include the information indicated below:

Switch Information File

Switch Name
Switch Type Name
Switch Code
Switch Command
   Switch Command Format String
Expected Response

Unassigned Telephone Number Inventory File

Telephone Number
Last Modified Timestamp
Status

Agent Valid Retail Sales Telephone Number File

Agent ID
Block Range
Call Restrictions
Feature Packages
Market Identifier
ESN Deny Status
ESN Deny Rate Stamp
ESN Deny Code

Customer Information File

Social Security Number
Name
Address
   Street, City, State, Zip
Summary Billing
Agent ID
Celsec Code
Service Area
Salesperson ID Taxes
Mobile Telephone Number
ESN
Contact Telephone Number
Credit Card Number
Account Number
Date Timestamp
Features (packages)
Coverage
Service Class
Status Flags

Market Identifier File

Switch Name
Switch Type
Logon Name
Logon Password
Telenet Address/Phone Number
Backup Phone Number
Line Connection Type
Line Discipline

Product Inventory File

Agent ID
Date of Transaction
ESN
Product Code
Product Delivered from HQ

Agent File

Agent ID
Full Agent Name
Agent Address
Agent Phone Number
Agent Password
Agent Restrictions
Salesperson ID
Salesperson Password
Salesperson Name
Salesperson Restrictions

Log File

Roamer Datafile

Roamer Mobile Number
Date Timestamp
Out-Date Stamp
Agent ID
Market Identifier

OPERATION OF CAS

With the prerequisite understanding of the CAS combined hardware and software architecture in hand, it is now possible to elaborate on the precise manner in which CAS permits a CMR customer to expeditiously gain access to CMR service Activation of a CMR customer under control of the subject CAS proceeds as follows. Initially, a selling agent gains access, or "logs on," to CAS by dialing, on a data entry device, such as telephone 20, a predetermined telephone access number. (Telephone 20 may be a standard telephone set. However, in the preferred embodiment telephone 20 should be capable of generating DTMF signals for the entry of data on the CAS regional processor.) Upon access to the CAS, the agent is then greeted with a verbal message welcoming him to CAS.

After log-on, CAS provides a voice prompt that guides the agent through the preliminary stage of the transaction. Initially, the voice prompt requests that the agent enter his Agent ID. After entering his Agent ID, the agent can inquire into an existing transaction by entering a Transaction Code, or he can indicate a desire to talk to a Customer Service Representative ("CSR"). (In order to enter a new transaction the agent must additionally enter his Personal Identification Number (PIN). However, in order to inquire into an existing transaction, the agent need enter only a valid Transaction Code.) In order to talk to a CSR at any time during a transaction, the agent need only press a predetermined key, for example, "0," on the telephone keypad If the agent enters his Agent ID, CAS responds with a voice prompt that requests the agent to enter his PIN.

CAS compares the Agent ID to the PIN. If a match is found to exist between the Agent ID and his PIN, CAS considers the agent qualified to enter a Transaction Code. If the Agent ID and the PIN do not match, CAS responds with a voice prompt that indicates that the Agent ID and PIN do not match. The agent is then prompted either to re-enter his Agent ID and his PIN, or to seek access to a CSR. If the agent chooses to re-enter and a match is again not obtained, CAS automatically connects the agent to a CSR. When the Agent ID and agent PIN have been entered correctly, CAS prompts the agent to select a transaction.

Specifically, the agent is prompted to enter a predetermined key, for example, the pound key ("#"), if the transaction to be entered is a new transaction. Once the pound key has been pressed, CAS responds with a voice prompt that announces the Transaction Code. In order to have the Transaction Code voice prompt repeated, the agent is prompted to enter a "1." To continue with the transaction, the agent is prompted to enter a "2."

If the agent is seeking to inquire into an existing transaction, he must enter the Transaction Code that identifies the transaction. CAS will then reach the regional processor's database for the matching Transaction Code. If a matching transaction cannot be found, or if a matching transaction is missing data, CAS responds with an appropriate voice prompt(s).

Specifically, if CAS locates the Transaction Code in the regional processor database, but determines that the transaction is missing some data, instructions will be sent back to the agent indicating the steps that need to be taken as a result of the inadequacy of the transaction data. On the other hand, if the Transaction Code simply cannot be found, the agent is prompted to re-enter the Transaction Code. If, upon re-entry, CAS remains unable to find a matching Transaction Code, the Transaction Incomplete File is read in order to determine whether a match resides there. If the Transaction Code is found in the Transaction Incomplete File, CAS identifies the additional data that is needed to complete the transaction. Should the transaction prove to be one that is pending (that is, one that has not been successfully completed), CAS sends instructions to the agent specifying the point at which the transaction-entry process is to resume.

In order to continue with the entry of a new transaction, which occurs when the agent enters a "2," CAS prompts the agent to enter the ESN of the CMR transceiver the customer has acquired Upon the entry of the ESN by the agent, CAS, through the ESN Server (see above), examines the database to determine the status of the ESN. The ESN Server determines whether the ESN is already active or whether it is inactive. If the ESN is already active, CAS responds with an appropriate voice prompt and automatically connects the agent with a CSR. When a new, valid, ESN has been entered, CAS prompts the agent to enter information that identifies the customer. In a preferred embodiment, this information is supplied in the form of the customer's social security number (SSN).

When the customer's SSN has been entered, CAS issues or voice prompt that repeats the SSN and allows the agent an opportunity to correct the SSN in the event that it has not been entered correctly.

Upon the accurate entry of a customer's SSN, CAS enters the CREDIT-SWITCH SM database (see below) and returns with a voice prompt that includes expanded identifying information, such as the customer's last name, first name, and address. CAS then prompts the agent to indicate whether or not the expanded information is correct. If incorrect, the agent may then either re-try or access a CSR. If the re-try is incorrect, the agent is automatically connected to a CSR. If the re-try is correct, CAS, through CICC Server, then commissions a credit service bureau to perform a credit check and issue a credit report.

In a preferred embodiment, the CICC Server commissions the credit report through a credit service bureau known as CREDIT SWITCH SM. This service is available from Magnum Communications Limited, having an office at 380 Interstate North Parkway, Atlanta, Ga. 30339. In general, CREDIT SWITCH SM provides access to data collected by selected consumer credit reporting agencies. Briefly, CAS, through CICC Server, transmits requests for credit reports to a remotely located CREDIT SWITCH SM computer. The request may be transmitted via either a synchronous or an asynchronous communications link originating, at one end, at the CAS regional processor. CREDIT-SWITCH SM then retrieves a credit report from a credit bureau selected by CAS, and reformats the report into a single, uniform format, irrespective of the credit reporting service that had been selected by CAS. The credit report is "scored" according to parameters established by CAS, and the analyzed report is returned to the regional processor.

When CAS has obtained the credit report, it establishes, based on the reported "score," the amount of deposit the customer will be required to place in order to obtain CMR service. CAS then responds with a voice prompt that specifies the amount of the deposit and, additionally, requests the agent to indicate whether the deposit will be paid in cash or by check. When the deposit amount and method of payment have been determined, CAS prompts the agent to enter an N-digit code corresponding to a Rate Plan.

In general, the Rate Plan plan establishes a formula by which the CMR service provider determines the manner in which a particular customer is to be billed. A CMR customer's monthly bill will include a monthly (flat) access charge and a charge that corresponds to the accumulated air time the customer logs during the relevant (monthly) billing period. Both the monthly access charge and the air-time rate can be expected to vary according to the Rate Plan applied to the specific customer. For example, a Basic Rate Plan might indicate a monthly access charge of $Y/month and an air-time charge of Y cents/minute. An Economy Rate Plan might specify a monthly access charge of $X/month, where X is less than Y, and an air-time charge of Z cents/minute, where Z is greater than Y. Under the Economy Rate Plan, a customer who believes he will require only a limited amount of air time will prefer to be charged a lower access charge, but will be willing to assume a higher air-time rate. Beyond these rate plans, a Discount Rate Plan may be made available to customers who agree to long-term service contracts, and Reseller and Bulk Purchase Rate Plans might similarly be offered. Most often, cellular service providers will offer on the order of two to ten rate plans, tailored to the needs of their customers.

However, it should be apparent from the above that the number of rate plans offered by a service provider is, in large part, a function of that service provider's creativity in satisfying the needs of his customers. In any event, for the purposes of this Description, it need be understood only that the Rate Plan may be identified by an N-digit code that is entered on CAS and ultimately determines the customer's monthly bill.

The agent is permitted two attempts to enter a Rate Plan. If, after the second attempt, the Rate Plan is determined to be invalid as entered, CAS automatically diverts the agent to a CSR. However, upon successful entry of a valid Rate Plan, CAS begins a procedure that is calculated to result in a telephone number (MID) verification and a switch activation.

This procedure begins when CAS prompts the agent to enter an area code (NPA) and a 3-digit exchange (NXX). These six numbers (NPA/NXX) identify the cellular system to which the customer is subscribing. CAS affords the agent an opportunity to correct this data in the event that it is incorrectly entered. Once the NPA/NXX number data is correctly entered, CAS examines the number data to determine whether the entered numbers are valid numbers in the cellular system CAS is then serving. If the NPA/NXX numbers are (locally) invalid, CAS provides a corresponding announcement to the agent. If the NPA/NXX numbers are valid, CAS announces that a mobile telephone number (MID) is being processed. This processing is done by the TNA Server described above. The TNA Server allocates the last four digits of the MID and then activates the cellular switch. Once the MID has been assigned, CAS prompts the agent with a message indicating that the switch has been activated and reveals the assigned MID. At this point, the agent may end the calling session by pressing the key "2."

If, during an attempt to assign an MID, the call to the cellular switch cannot be completed properly—as may be indicated, for example, when the call is not responded to before the end of a 20-second "time out" period—CAS announces that the assignment of an MID is delayed. When this occurs, CAS provides three options: (1) The agent can repeat the transaction code, and CAS will re-try switch activation; (2) The agent can later enter a Call-Back, using the existing Transaction Code; or (3) The attempt to assign an MID can be placed in a Call-Back queue, and the agent will be called back when the transaction is completed.

If the agent selects the Call-Back option, the following procedure will occur. At the time CAS has been able to effect switch activation, CAS will dial the agent's telephone number, and the agent will be informed that switch activation has been effected. In an alternate embodiment, the agent may be offered an opportunity to accept or deny the Transaction Code. If the agent accepts the Transaction Code, that is, accepts the switch activation status, CAS responds with a voice prompt that announces that the activation has been approved and that informs the agent what MID has been assigned to the customer. If the agent denies phone activation, CAS similarly provides a voice prompt to that effect. In the case of either acceptance or denial, the agent may reach a CSR by pressing the key "0" or may terminate the telephone call by pressing the key "1."

At this point the customer has been activated on the relevant cellular switch, and interaction between the agent and CAS, at least with respect to that particular customer's activation, has been concluded.

However, CAS now proceeds to enter the customer's Billing Record on a main billing processor. The function is accomplished through Billing System Update Server described above. In practice the Billing System Update Server extracts information from a Customer Information File and make that information available to an external billing system such as the Cellular Account Management System ("CAMS") available from GTE Data Services Incorporated, Tampa, Fla. 33602. Transfer of data between the regional processor and CAMS occurs over a dedicated line at the X.25 protocol From the above Description, it may be appreciated that the Customer Activation System has been designed to activate the switch that adds a new customer to the system and into the main billing system. CAS is designed to provide the new customer with virtually instantaneous access to his newly acquired mobile telephone, thereby eliminating the extended processing time between the purchase of the mobile telephone and the actual use of the telephone. In order to achieve this result, CAS relies on automated method of entering customer information, customer credit checking, telephone number assignment, switch insertion and activation of the new number, and billing activation of the new customer.

By way of reiteration, CAS receives a call from a selling agent, who inputs required data via a DTMF telephone and then responds to the system-supplied voice prompts in order to properly complete the transaction CAS validates and processes the agent-entered data and returns the results to the agent.

The next step involves the performance of a credit check. The agent inputs the customer's social security number, and CAS expands upon and uses that data to obtain an outside credit check. CAS takes the validated data, expands upon it through a call to an outside information source (e.g., CREDIT-SWITCH®), and returns a name to the agent for validation. If proper validation cannot take place, the agent at this point may request assistance from a Customer Service Representative.

If credit is approved, then CAS assigns a new mobile telephone number (MID) to the customer Next, CAS inserts and activates that MID in the appropriate cellular switch and sends a confirmation notice to the agent and to the customer. CAS then generates a billing record for entry into the mail billing computer system. After the billing record is properly generated and inserted, CAS generates a "Welcome" letter for mailing to the new customer. This letter confirms the customer's personal data, the options selected for the new mobile telephone, the rate schedules and taxes, and information regarding new or additional services that are available to the customer. CAS will also maintain a product inventory database to ensure prompt and automatic replenishment of vendor stock. As an added advantage, CAS also enables a Customer Service Representative to monitor and modify transactions online, ensuring that the customer receives quick and accurate service.

Accordingly, although there has been disclosed and described what at present is deemed to be a preferred embodiment of a Customer Activation System for automatically and expeditiously providing a CMR customer access to CMR service, it will be obvious to those having ordinary skill in the art that various modifications can be made to that System without departure from the concept of the invention or the scope of the appended claims.

In particular, although the subject CAS has been described as based on a regional processor generally dedicated to a local cellular system, the inventive concept described herein is susceptible to use as well in a system that relies on a centralized processor that may be accessed by a number of cellular systems that desire to provide features inherent to CAS. However, it is understood that a "centralized" CAS would likely require a processor configuration of enlarged scope. The centralized approach might be expected to lessen the total hardware acquisition cost, but the diminution in hardware expense would likely be achieved only at the expense of exposure to the catastrophic failure that might occur in the event that the centralized processor experiences a failure. In addition, the distributed, regional processor approach allows the regional processors to be interconnected so that the effects of the failure of one regional processor can be mitigated at least to the extent that the regional processor's workload may be handed off to another regional processor.

In addition, CAS has been described above as being primarily accessible to selling agents through data entry devices realized in the form of DTMF telephone sets. It is clear that the invention contemplates operation with other forms of data entry devices including, but not limited to, computer terminals. However, DTMF telephone are attractive not only because of their pervasiveness and moderate cost but also because of their ability both to transmit DTMF data to the CAS processor and to receive the voice prompts generated by CAS.

I claim:

1. A Customer Activation System for expeditiously providing a CMR customer access to CMR service, the System comprising:
    a regional processor programmed to:
    (a) accept information identifying the CMR customer;
    (b) obtain a credit check of the CMR customer;
    (c) assign a telephone number to the CMR customer; and
    (d) insert and activate the telephone number in a cellular switch.

2. A Customer Activation System as defined in claim 1 further comprising data entry means for entering an ESN.

3. A Customer Activation System as defined in claim 2 wherein the regional processor is programmed to determine whether an ESN entered by the data entry means is a valid ESN or an invalid ESN.

4. A Customer Activation System as defined in claim 1 further comprising data entry means for entering information identifying the CMR customer.

5. A Customer Activation System as defined in claim 4 wherein the regional processor is programmed to provide a verbal prompt, the contents of which prompt depend on the information identifying the CMR customer.

6. A Customer Activation System as defined in claim 5 wherein the regional processor is programmed so that, if the verbal prompt is correct, the regional processor undertakes a credit check of the CMR customer.

7. A Customer Activation System as defined in claim 6 further comprising data entry means for entering an ESN.

8. A Customer Activation System as defined in claim 7 wherein the regional processor is programmed to determine whether the ESN entered by the data entry means is a valid ESN or an invalid ESN.

9. A Customer Activation System as defined in claim 8, wherein the regional processor is programmed to accept number data corresponding to a specific NPA/NXX, provided that (1) the ESN is valid, (2) the verbal prompt is correct, and (3) the credit check results in approval.

10. A Customer Activation System as defined in claim 9 wherein the regional processor is programmed to allocate a suffix to the NPA/NXX so as to formulate a cellular telephone number and is programmed to activate the cellular telephone number so formulated in a cellular switch.

11. A Customer Activation System as defined in claim 10 wherein the data entry means is a telephone set that is coupled to the regional processor and that is capable of transmitting to the regional processor DTMF signals.

12. In a Customer Activation System that includes a processor programmed to (i) accept information identifying a CMR customer, (ii) obtain a credit report related to the CMR customer, and (iii) validate CMR equipment intended to be used by the customer:
   means for accepting number data corresponding to the NPA/NXX of a cellular system to which the CMR customer intends to subscribe, and
   means for formulating an MID.

13. In a Customer Activation System as defined in claim 12:
   means for inserting and activating the MID in a cellular switch associated with the cellular system to which the customer intends to subscribe.

14. A method for expeditiously providing a CMR customer access to CMR service, the method comprising the steps:
   (a) entering information, in a regional processor, that identifies the CMR customer;
   (b) performing, through facilities available to the regional processor, a credit check of the CMR customer;
   (c) assigning a telephone number to the CMR customer; and
   (d) inserting and activating, through the facilities of the regional processor, the telephone number in a cellular switch.

15. A method for expeditiously providing a CMR customer access to CMR service as defined in claim 14 wherein the method comprises the further step of, prior to at least Step (c), entering an ESN in the regional processor and determining whether the ESN is valid or invalid.

16. A method for expeditiously providing a CMR customer access to CMR service as defined in claim 14 where the information identifying the CMR customer is a social security number.

17. A method for expeditiously providing a CMR customer access to CMR service as defined in claim 16 wherein the data identifying the CMR customer is entered through a telephone set coupled to the regional processor and capable of transmitting to the regional processor DTMF signals.

18. A method for expeditiously providing a CMR customer access to CMR service as defined in claim 14 wherein Step (c) includes the substeps:
   (c.1) entering into the regional processor an area code and a 3-digit exchange;
   (c.2) determining whether the area code and
   (c.3) if the area code and 3-digit exchange are valid, allocating a 4-digit suffix required to complete the telephone number.

19. A Customer Activation System for expeditiously providing a CMR customer access to CMR service, the System comprising:
   (a) a regional processor programmed to (1) accept information identifying the CMR customer, (2) obtain a credit report of the CMR customer, (3) assign a telephone number to the CMR customer, (4) insert and activate the telephone number in a cellular switch; and
   (b) means for making available to the regional processor an ESN and information identifying the CMR customer.

20. A Customer Activation System for expeditiously providing a CMR customer access to CMR service as defined in claim 19 wherein said means includes a telephone set that is coupled to and capable of transmitting DTMF information to the regional processor, said DTMF information identifying the CMR customer.

21. A Customer Activation System for expeditiously providing a CMR customer access to CMR service as defined in claim 20 wherein the regional processor is programmed to format a record based on information related to the CMR customer and to access a billing processor in order to insert into the billing processor the formatted record.

22. A Customer Activation System for expeditiously providing a CMR customer access to CMR service as defined in claim 20 wherein the regional processor is programmed to generate a "Welcome" letter addressed to the CMR customer.

23. A Customer Activation System for expeditiously providing a CMR customer access to CMR service as defined in claim 22 wherein the "Welcome" letter:
   (1) Outlines services purchased by the CMR customer, the available features of a CMR system to which the CMR customer has subscribed, and the available features of that CMR system; and
   (2) Suggests new features that the CMR customer may purchase.

24. A Customer Activation System for expeditiously providing a CMR customer access to CMR service as defined in claim 23 wherein the regional processor is programmed to generate the "Welcome" letter either in either a batch mode or in an on-line mode.

25. A method, utilizing a processor, for providing a customer expeditious access to Cellular Mobile Radiotelephone (CMR) service, the method comprising the steps:
   (a) entering an Agent ID and a PIN;
   (b) entering, through a data entry means that is coupled to the processor, a symbol that indicates to the processor that a new transaction is to begin;
   (c) entering, through the data entry means, the ESN associated with CMR equipment the customer intends to use;

(d) entering, through the data entry means, data identifying the customer;

(e) entering, through the data entry means, a Rate Plan that the customer has selected; and (f) entering, through the data entry means, an area code and a three-digit exchange corresponding to the CMR system to which the customer intends to subscribe.

26. A method for providing a customer expeditious access to CMR service as defined in claim 25 wherein, during the course of any one or more of Step (a) through Step (f), the processor establishes a connection to a Customer Service Representative.

27. A Customer Activation System for expeditiously providing a CMR customer access to CMR service, the System comprising a processor accessible by a selling agent via a data entry apparatus, wherein the processor is operable to:

(a) accept an ESN, entered through the data entry apparatus, associated with CMR equipment that the CMR customer intends to use;

(b) accept data, entered through the data entry apparatus, identifying the CMR customer;

(c) obtain a credit check of the CMR customer; and (d) insert and activate in a cellular switch an MID to be used by the CMR customer.

28. A Customer Activation System for expeditiously providing a CMR customer access to CMR service as defined in claim 27 wherein the processor is operable to deliver verbal prompts to the selling agent.

29. A Customer Activation System for expeditiously providing a CMR customer access to CMR service as defined in claim 28 wherein the verbal prompts are audible prompts.

30. A Customer Activation System for expeditiously providing a CMR customer access to CMR service as defined in claim 28 wherein the processor is operable to accept DTMF data originating with the data entry apparatus and delivered to the processor over a communications network.

31. A Customer Activation System for expeditiously providing a CMR customer access to CMR service as defined in claim 30 wherein the data entry apparatus is a telephone set.

32. A Customer Activation System for expeditiously providing a CMR customer access to CMR service as defined in claim 30 wherein the data identifying the customer is a social security number (SSN) and wherein the processor is operable to access a database so as to associate a name with the SSN.

33. A Customer Activation System for expeditiously providing a CMR customer access to CMR service as defined in claim 32 wherein the processor is operable to associate an address with the SSN.

34. A Customer Activation System ("CAS") for activating a cellular mobile radiotelephone ("CMR") customer on a cellular switch, the System comprising:

means for accepting information identifying the CMR customer so as to enable a credit report to be obtained;

means for obtaining a credit report related to the CMR customer;

means for formulating an MID to be assigned to the CMR customer; and means for inserting and activating the assigned MID on a cellular switch.

35. A CAS for activating a CMR customer on a cellular switch as defined in claim 34 wherein said means all include a processor.

36. A CAS for activating a CMR customer on a cellular switch as defined in claim 35 wherein the processor is a regional processor substantially dedicated to use with an associated cellular system and physically located within the geographical area covered by that system.

37. A CAS for activating a CMR customer on a cellular switch as defined in claim 35 and further comprising means for entering a billing record related to the CMR custom on a billing system.

38. A CAS for activating a CMR customer on a cellular switch as defined in claim 37 and further comprising means for validating equipment intended to be used by the CMR customer.

39. Apparatus, in the form of a software system, for providing a cellular mobile radiotelephone (CMR) customer access to CMR service, the apparatus comprising:

first software means for accepting data, in the form of a social security number, identifying the customer and for accepting data, in the form of an ESN, identifying CMR equipment which the customer intends to use; and second software means, called by the first software means, for assigning the customer an MID and for inserting and activating that MID in a cellular switch.

40. Apparatus in the form of a software system for providing a cellular mobile radiotelephone (CMR) customer access to CMR service, the apparatus comprising:

first software means for accepting data identifying the customer and identifying CMR equipment which the customer intends to use;

second software means, called by the first software means, for assigning the customer an MID and for inserting and activating that MID in a cellular switch; and third software means, called by the first software means, for expanding on the data identifying the customer and for obtaining a credit report on the customer.

41. Apparatus as defined in claim 40 wherein the third software means includes means for determining a deposit to be required of the customer.

42. Apparatus as defined in claim 41 further comprising:

fourth software means for generating a billing record to be entered on a billing processor, wherein said billing record is generated after the credit report has been obtained and after the MID has been assigned and inserted and activated on a cellular switch.

* * * * *